(12) United States Patent
Eskilsson

(10) Patent No.: US 9,952,883 B2
(45) Date of Patent: Apr. 24, 2018

(54) DYNAMIC DETERMINATION OF HARDWARE

(71) Applicant: Tobii AB, Danderyd (SE)

(72) Inventor: Henrik Eskilsson, Stockholm (SE)

(73) Assignee: Tobii AB, Danderyd (SE)

( * ) Notice: Subject to any disclaimer, the term of this patent is extended or adjusted under 35 U.S.C. 154(b) by 9 days.

(21) Appl. No.: 14/819,163

(22) Filed: Aug. 5, 2015

(65) Prior Publication Data

US 2016/0041832 A1 Feb. 11, 2016

Related U.S. Application Data

(60) Provisional application No. 62/033,540, filed on Aug. 5, 2014.

(51) Int. Cl.
*G06F 9/445* (2006.01)
*G06F 11/30* (2006.01)

(52) U.S. Cl.
CPC ...... *G06F 9/44505* (2013.01); *G06F 11/3024* (2013.01); *G06F 11/3051* (2013.01)

(58) Field of Classification Search
CPC .. G06F 9/44505; G06F 9/4411; G06F 9/4413; G06F 9/4415; G06F 11/3024; G06F 11/3051
See application file for complete search history.

(56) References Cited

U.S. PATENT DOCUMENTS

| | | | |
|---|---|---|---|
| 5,218,387 A | 6/1993 | Ueno et al. | |
| 5,294,427 A | 3/1994 | Sasaki et al. | |
| 5,471,542 A | 11/1995 | Ragland | |
| 5,638,176 A | 6/1997 | Hobbs et al. | |
| 5,787,246 A * | 7/1998 | Lichtman | G06F 15/177 709/220 |
| 5,850,211 A | 12/1998 | Tognazzini | |
| 6,067,565 A | 5/2000 | Horvitz | |
| 6,085,226 A | 7/2000 | Horvitz | |
| 6,152,563 A | 11/2000 | Hutchinson et al. | |
| 6,204,828 B1 | 3/2001 | Amir et al. | |

(Continued)

FOREIGN PATENT DOCUMENTS

| | | |
|---|---|---|
| DE | 19731301 | 1/1999 |
| EP | 0816980 | 1/1998 |

(Continued)

OTHER PUBLICATIONS

Final Office Action for U.S. Appl. No. 13/802,240, dated Jun. 23, 2015, 14 pages.

(Continued)

*Primary Examiner* — Dennis M Butler
(74) *Attorney, Agent, or Firm* — Kilpatrick Townsend & Stockton LLP

(57) ABSTRACT

According to the invention, a method for determining what hardware components are installed on a computing device is disclosed. The method may include identifying the computing device, and determining, based on the computing device, a hardware component of the computing device. The method may also include retrieving information about the hardware component, and setting, based at least in part on the information about the hardware component, a parameter for an algorithm of software on the computing device.

13 Claims, 4 Drawing Sheets

(56) References Cited

U.S. PATENT DOCUMENTS

| | | | |
|---|---|---|---|
| 6,204,974 B1 | 3/2001 | Spitzer | |
| 6,351,273 B1 | 2/2002 | Lemelson et al. | |
| 6,393,584 B1 | 5/2002 | McLaren et al. | |
| 6,421,064 B1 | 7/2002 | Lemelson et al. | |
| 6,421,604 B1 | 7/2002 | Koyanagi et al. | |
| 6,578,962 B1 | 6/2003 | Amir et al. | |
| 6,603,491 B2 | 8/2003 | Lemelson et al. | |
| 6,675,075 B1 | 1/2004 | Engelsberg et al. | |
| 6,734,845 B1 | 5/2004 | Nielsen et al. | |
| 6,792,452 B1* | 9/2004 | Philyaw | G06F 9/4411 707/E17.112 |
| 6,873,314 B1 | 3/2005 | Campbell | |
| 6,882,354 B1 | 4/2005 | Nielsen | |
| 6,886,137 B2 | 4/2005 | Peck et al. | |
| 7,013,258 B1 | 3/2006 | Su et al. | |
| 7,091,928 B2 | 8/2006 | Rajasingham | |
| 7,113,170 B2 | 9/2006 | Lauper et al. | |
| 7,206,828 B1* | 4/2007 | Bourke-Dunphy | G06F 9/44505 709/221 |
| 7,306,337 B2 | 12/2007 | Ji et al. | |
| 7,346,195 B2 | 3/2008 | Lauper et al. | |
| 7,380,938 B2 | 6/2008 | Chmielewski et al. | |
| 7,486,302 B2 | 2/2009 | Shoemaker | |
| 7,549,743 B2 | 6/2009 | Huxlin et al. | |
| 7,561,143 B1 | 7/2009 | Milekic | |
| 7,572,008 B2 | 8/2009 | Elvesjo et al. | |
| 7,602,924 B2 | 10/2009 | Kleen | |
| 7,614,011 B2 | 11/2009 | Karidis et al. | |
| 7,630,254 B2 | 12/2009 | Lutze | |
| 7,630,524 B2 | 12/2009 | Lauper et al. | |
| 7,634,528 B2 | 12/2009 | Horvitz et al. | |
| 7,668,317 B2 | 2/2010 | Yang et al. | |
| 7,792,391 B2 | 9/2010 | Arima | |
| 7,806,525 B2 | 10/2010 | Howell et al. | |
| 8,066,375 B2 | 11/2011 | Skogö et al. | |
| 8,094,122 B2 | 1/2012 | Molander et al. | |
| 8,226,574 B2 | 7/2012 | Whillock et al. | |
| 8,235,529 B1 | 8/2012 | Raffle et al. | |
| 8,339,446 B2 | 12/2012 | Blixt et al. | |
| 8,407,263 B2 | 3/2013 | Elad et al. | |
| 8,472,120 B2 | 6/2013 | Border et al. | |
| 8,487,838 B2 | 7/2013 | Lewis et al. | |
| 8,488,246 B2 | 7/2013 | Border et al. | |
| 8,500,271 B2 | 8/2013 | Howell et al. | |
| 8,564,533 B2 | 10/2013 | Yuan | |
| 8,620,913 B2 | 12/2013 | Hough et al. | |
| 8,643,680 B2 | 2/2014 | Baldwin et al. | |
| 8,756,516 B2 | 6/2014 | Singh et al. | |
| 8,786,953 B2 | 7/2014 | Wheeler et al. | |
| 8,963,806 B1 | 2/2015 | Starner et al. | |
| 9,041,787 B2 | 5/2015 | Andersson et al. | |
| 2002/0105482 A1 | 8/2002 | Lemelson et al. | |
| 2002/0180799 A1 | 12/2002 | Peck et al. | |
| 2003/0020755 A1 | 1/2003 | Lemelson et al. | |
| 2003/0052903 A1 | 3/2003 | Weast et al. | |
| 2003/0098954 A1 | 5/2003 | Amir et al. | |
| 2004/0175020 A1 | 9/2004 | Bradski et al. | |
| 2004/0199663 A1 | 10/2004 | Horvitz et al. | |
| 2005/0047629 A1 | 3/2005 | Farrell et al. | |
| 2005/0221268 A1 | 10/2005 | Chaar et al. | |
| 2006/0066567 A1 | 3/2006 | Scharenbroch et al. | |
| 2006/0087502 A1 | 4/2006 | Karidis et al. | |
| 2006/0192775 A1 | 8/2006 | Nicholson et al. | |
| 2007/0030442 A1 | 2/2007 | Howell et al. | |
| 2007/0078552 A1 | 4/2007 | Rosenberg | |
| 2007/0122064 A1 | 5/2007 | Arima | |
| 2007/0132663 A1 | 6/2007 | Iba et al. | |
| 2007/0164990 A1 | 7/2007 | Bjorklund et al. | |
| 2008/0074389 A1 | 3/2008 | Beale | |
| 2008/0148149 A1 | 6/2008 | Singh et al. | |
| 2008/0270474 A1 | 10/2008 | Flake et al. | |
| 2008/0278682 A1 | 11/2008 | Huxlin et al. | |
| 2008/0281915 A1 | 11/2008 | Elad et al. | |
| 2009/0086165 A1 | 4/2009 | Beymer | |
| 2009/0122161 A1 | 5/2009 | Bolkhovitinov | |
| 2009/0146950 A1 | 6/2009 | Maringelli | |
| 2009/0273562 A1 | 11/2009 | Baliga et al. | |
| 2009/0315827 A1 | 12/2009 | Elvesjö et al. | |
| 2010/0066975 A1 | 3/2010 | Rehnstrom | |
| 2010/0079508 A1 | 4/2010 | Hodge et al. | |
| 2010/0110368 A1 | 5/2010 | Chaum | |
| 2010/0125816 A1 | 5/2010 | Bezos | |
| 2010/0182232 A1 | 7/2010 | Zamoyski | |
| 2010/0225668 A1 | 9/2010 | Tatke et al. | |
| 2010/0271587 A1 | 10/2010 | Pavlopoulos | |
| 2010/0295774 A1 | 11/2010 | Hennessey | |
| 2011/0007277 A1 | 1/2011 | Solomon | |
| 2011/0037606 A1 | 2/2011 | Boise | |
| 2011/0045810 A1 | 2/2011 | Issa et al. | |
| 2011/0115703 A1 | 5/2011 | Iba et al. | |
| 2011/0119361 A1 | 5/2011 | Issa et al. | |
| 2011/0140994 A1 | 6/2011 | Noma | |
| 2011/0270123 A1 | 11/2011 | Reiner | |
| 2011/0279666 A1 | 11/2011 | Strömbom et al. | |
| 2012/0011170 A1 | 1/2012 | Elad et al. | |
| 2012/0050273 A1 | 3/2012 | Yoo et al. | |
| 2012/0075168 A1 | 3/2012 | Osterhout et al. | |
| 2012/0163606 A1 | 6/2012 | Eronen et al. | |
| 2012/0194419 A1 | 8/2012 | Osterhout et al. | |
| 2012/0230547 A1 | 9/2012 | Durnell et al. | |
| 2012/0235883 A1 | 9/2012 | Border et al. | |
| 2012/0235900 A1 | 9/2012 | Border et al. | |
| 2012/0256967 A1 | 10/2012 | Baldwin et al. | |
| 2012/0272179 A1 | 10/2012 | Stafford | |
| 2012/0288139 A1 | 11/2012 | Singhar | |
| 2013/0044042 A1 | 2/2013 | Olsson et al. | |
| 2013/0044055 A1 | 2/2013 | Karmarkar et al. | |
| 2013/0050070 A1 | 2/2013 | Lewis et al. | |
| 2013/0127980 A1 | 5/2013 | Haddick et al. | |
| 2013/0163089 A1 | 6/2013 | Bohn | |
| 2013/0176208 A1 | 7/2013 | Tanaka et al. | |
| 2013/0176250 A1 | 7/2013 | Lee et al. | |
| 2013/0198504 A1* | 8/2013 | Arnold | G06F 9/44 713/2 |
| 2013/0201080 A1 | 8/2013 | Evans et al. | |
| 2013/0208926 A1 | 8/2013 | Vincent et al. | |
| 2013/0257709 A1 | 10/2013 | Raffle et al. | |
| 2013/0275883 A1 | 10/2013 | Bharshankar et al. | |
| 2013/0283208 A1 | 10/2013 | Bychkov et al. | |
| 2013/0286178 A1 | 10/2013 | Lewis et al. | |
| 2013/0300654 A1 | 11/2013 | Seki | |
| 2013/0314303 A1 | 11/2013 | Osterhout et al. | |
| 2013/0325463 A1 | 12/2013 | Greenspan et al. | |
| 2014/0010391 A1 | 1/2014 | Ek et al. | |
| 2014/0019136 A1 | 1/2014 | Tanaka | |
| 2014/0038154 A1* | 2/2014 | Brownlow | G09B 5/06 434/317 |
| 2014/0126782 A1 | 5/2014 | Takai et al. | |
| 2014/0154651 A1 | 6/2014 | Stack | |
| 2014/0160001 A1 | 6/2014 | Kinnebrew et al. | |
| 2014/0168054 A1 | 6/2014 | Yang et al. | |
| 2014/0184550 A1 | 7/2014 | Hennessey et al. | |
| 2014/0191948 A1 | 7/2014 | Kim et al. | |
| 2014/0195918 A1 | 7/2014 | Friedlander | |
| 2014/0247208 A1 | 9/2014 | Henderek et al. | |
| 2014/0247210 A1 | 9/2014 | Henderek et al. | |
| 2014/0247215 A1 | 9/2014 | George-Svahn et al. | |
| 2014/0247232 A1 | 9/2014 | George-Svahn et al. | |
| 2014/0268054 A1 | 9/2014 | Olsson et al. | |
| 2014/0328505 A1 | 11/2014 | Heinemann et al. | |
| 2015/0052596 A1* | 2/2015 | Ayanam | G06F 21/572 726/8 |
| 2015/0055808 A1 | 2/2015 | Vennstrom et al. | |
| 2015/0058812 A1 | 2/2015 | Lindh et al. | |
| 2015/0061995 A1 | 3/2015 | Gustafsson et al. | |
| 2015/0061996 A1 | 3/2015 | Gustafsson et al. | |
| 2015/0062322 A1 | 3/2015 | Gustafsson et al. | |
| 2015/0062323 A1 | 3/2015 | Gustafsson et al. | |
| 2015/0063603 A1 | 3/2015 | Henderek et al. | |
| 2015/0138079 A1 | 5/2015 | Lannsjö | |

(56) References Cited

U.S. PATENT DOCUMENTS

| | | | |
|---|---|---|---|
| 2015/0138244 A1 | 5/2015 | George-Svahn et al. | |
| 2015/0143293 A1 | 5/2015 | George-Svahn et al. | |

FOREIGN PATENT DOCUMENTS

| | | |
|---|---|---|
| EP | 0816980 | 11/1998 |
| EP | 0903662 | 3/1999 |
| EP | 0912932 | 5/1999 |
| EP | 0816980 | 1/2001 |
| EP | 1646026 | 4/2006 |
| EP | 0912932 | 8/2006 |
| EP | 1812881 | 8/2007 |
| EP | 1832753 | 9/2007 |
| EP | 1854516 | 11/2007 |
| EP | 1970649 | 9/2008 |
| EP | 2048326 | 4/2009 |
| EP | 1646026 | 9/2009 |
| EP | 2075430 | 7/2010 |
| EP | 2613224 | 7/2013 |
| EP | 2695046 | 2/2014 |
| EP | 2752733 | 7/2014 |
| EP | 2762997 | 8/2014 |
| GB | 2281838 | 3/1995 |
| WO | 1998003907 | 1/1998 |
| WO | 2006045843 | 5/2006 |
| WO | 2009129222 | 10/2009 |
| WO | 2010051037 | 5/2010 |
| WO | 2010085977 | 8/2010 |
| WO | 2010127714 | 11/2010 |
| WO | 2010132991 | 11/2010 |
| WO | 2010141403 | 12/2010 |
| WO | 2012138744 | 10/2012 |
| WO | 2012145180 | 10/2012 |
| WO | 2013033842 | 3/2013 |
| WO | 2013067230 | 5/2013 |
| WO | 2013117727 | 8/2013 |
| WO | 2013144807 | 10/2013 |
| WO | 2013168173 | 11/2013 |
| WO | 2014134623 | 9/2014 |
| WO | 2015027241 | 2/2015 |
| WO | 2015034560 | 3/2015 |
| WO | 2015034561 | 3/2015 |

OTHER PUBLICATIONS

Non-Final Office Action for U.S. Appl. No. 13/802,240, dated Mar. 20, 2015, 20 pages.
Final Office Action for U.S. Appl. No. 13/894,424, dated May 8, 2015, 35 pages.
Non-Final Office Action for U.S. Appl. No. 13/894,424, dated Dec. 19, 2014, 32 pages.
Non-Final Office Action for U.S. Appl. No. 14/195,789, dated May 12, 2015, 15 pages.
Non-Final Office Action for U.S. Appl. No. 14/281,587, dated Aug. 8, 2014, 23 pages.
Notice of Allowance for U.S. Appl. No. 14/281,587, dated Jan. 21, 2015, 16 pages.
Non-Final Office Action for U.S. Appl. No. 14/467,944, dated Oct. 20, 2014, 18 pages.
Notice of Allowance for U.S. Appl. No. 14/467,944, dated Apr. 17, 2015, 12 pages.
Kumar et al., "Gaze-enhanced Scrolling Techniques", ACM, UIST'07, Oct. 7-10, 2007, 4 pages.
International Search Report and Written Opinion for PCT Application No. PCT/US2014/020024, dated Jul. 29, 2014, 15 pages.
International Search Report and Written Opinion for PCT Application No. PCT/US2014/038651, dated Oct. 23, 2014, 3 pages.
International Search Report and Written Opinion for PCT Application No. PCT/US2014/038653, dated Oct. 22, 2014, 3 pages.
International Search Report and Written Opinion for PCT Application No. PCT/US2014/052562, dated Nov. 18, 2014, 11 pages.
Tian et al., "Dynamic Visual Acuity During Transient and Sinusoidal Yaw Rotation in Normal and Unilaterally Vestibulopathic Humans", Experimental Brain Research, Springer international DE, vol. 137, No. 1, Mar. 1, 2001, pp. 12-25.

* cited by examiner

135

| Computing Device | CD ID | Hardware Component | HW ID | Characteristics | Parameters |
|---|---|---|---|---|---|
| Personal Computer | PC123 | Camera | C456 | Location ABC Capabilities GHI | Parameter Set DEF |
| Personal Computer | PC123 | Eye Tracker | ET789 | Location JKL Capabilities MNO | Parameter Set PQR |
| Laptop/ Notebook | LN123 | Camera | C789 | Location STU Capabilities WXY | Parameter Set ABC |
| Laptop/ Notebook | LN123 | Touchpad | TP456 | Location DEF Capabilities GHI | Parameter Set JKL |
| Tablet | T123 | Camera | C123 | Location MNO Capabilities PQR | Parameter Set STU |
| Tablet | T123 | Illuminator | ILL456 | Location WXY Capabilities ABC | Parameter Set DEF |
| Mobile Phone | MP123 | Camera | C123 | Location GHI Capabilities JKL | Parameter Set MNO |
| Mobile Phone | MP123 | NIR Illuminator | NIL456 | Location PQR Capabilities STU | Parameter Set VWX |
| Mobile Phone | MP123 | Display Screen | DS789 | Location ABC Capabilities DEF | Parameter Set GEF |

Fig. 2

DYNAMIC DETERMINATION OF HARDWARE

CROSS-REFERENCE TO RELATED APPLICATIONS

This application claims priority to Provisional U.S. Patent Application No. 62/033,540 filed Aug. 5, 2014, entitled "DYNAMIC DETERMINATION OF HARDWARE FOR EYE TRACKING," the entire disclosure of which is hereby incorporated by reference, for all purposes, as if fully set forth herein.

BACKGROUND OF THE INVENTION

This invention relates generally to determining hardware associated with a computing device. More specifically, the invention relates to determining the characteristics of such hardware so that software on the computing device can use such hardware in a more effective manner.

BRIEF DESCRIPTION OF THE INVENTION

In one embodiment, a method for determining what hardware components are installed on a computing device is provided. The method may include identifying the computing device, and determining, based on the computing device, a hardware component of the computing device. The method may also include retrieving information about the hardware component, and setting, based at least in part on the information about the hardware component, a parameter for an algorithm of software on the computing device.

In another embodiment, a non-transitory machine readable medium having instructions thereon for determining what hardware components are installed on a computing device is provided. The instructions may be executable by one or more processors for identifying the computing device, and determining, based on the computing device, a hardware component of the computing device. The instructions may also be executable for retrieving information about the hardware component, and setting, based at least in part on the information about the hardware component, a parameter for an algorithm of software on the computing device.

In another embodiment, a system for determining what hardware components are installed on a computing device is provided. The system may include one or more processors. The processor(s) may be for identifying the computing device, and determining, based on the computing device, a hardware component of the computing device. The processor(s) may also be for retrieving information about the hardware component, and setting, based at least in part on the information about the hardware component, a parameter for an algorithm of software on the computing device.

BRIEF DESCRIPTION OF THE DRAWINGS

The present invention is described in conjunction with the appended figures:

FIG. 2 is an example database possibly employed by the systems of FIG. 1;

Figure 1:
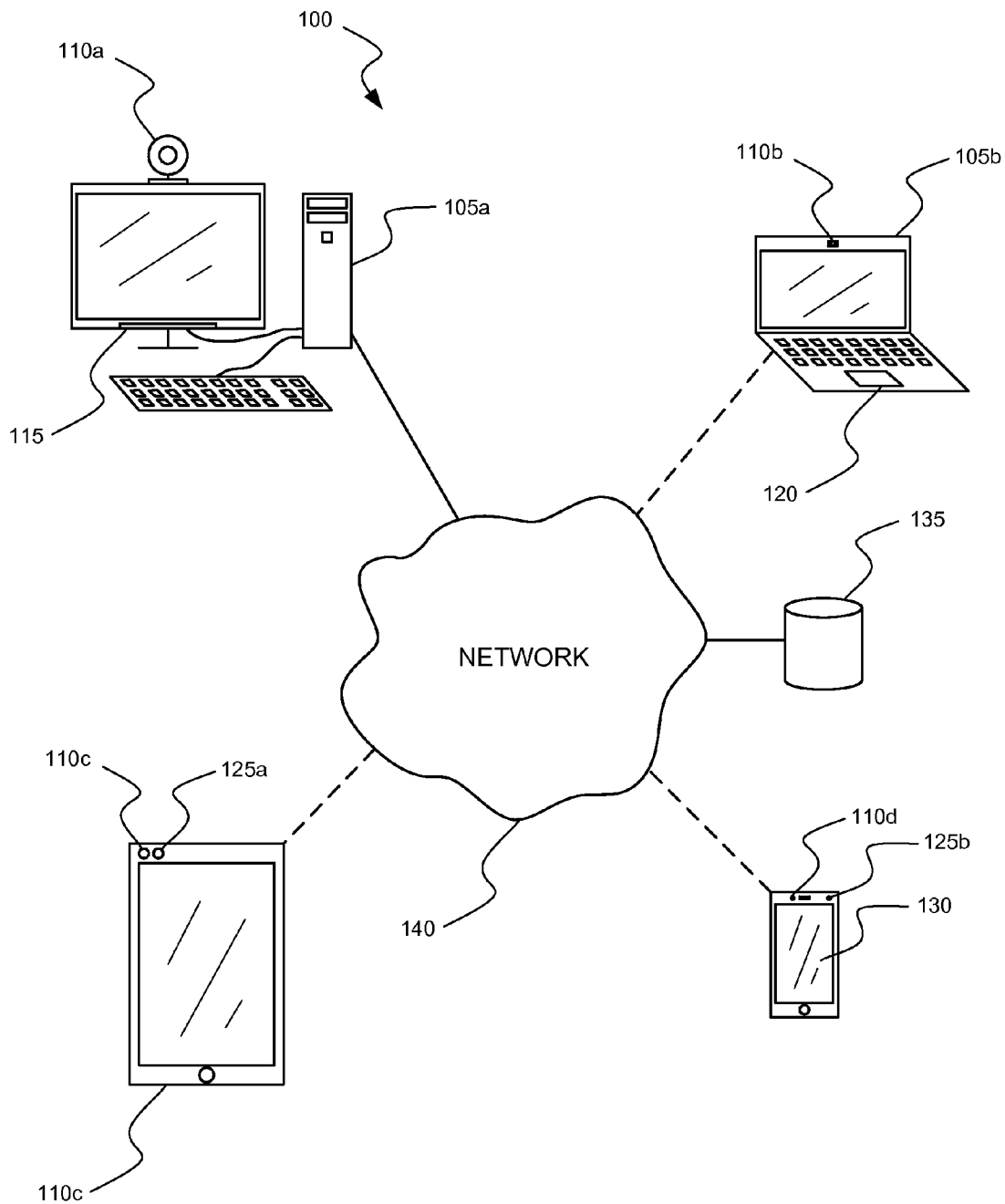
FIG. 1 is a diagram representing one possible environment of various embodiments of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Turning now to FIG. 1, a diagram representing one possible environment 100 of various embodiments of the invention is shown. In this embodiment, multiple potential computing devices 105 may employ various methods of the invention.

Environment 100 may include a personal computer 105*a* having hardware components such as camera 110*a* and eye tracking device 115. Personal computer 105*a* may also have other hardware components such as a display screen, tactile input devices, and other hardware components, shown and not shown in FIG. 1.

Environment 100 may also include a laptop or notebook computer 105*b* having hardware components such as camera 110*b* and touchpad 120. Laptop or notebook computer 105*b* may also have other hardware components such as a display screen, tactile input devices, and other hardware components, shown and not shown in FIG. 1.

Environment 100 may also include a tablet computer 105*c* having hardware components such as camera 110*c*, and near infrared or other illuminator 125*a*. Tablet computer 105*c* may also have other hardware components such as a display screen, touch screen input devices and other hardware components, shown and not shown in FIG. 1.

Environment 100 may also include a mobile phone 105*d* having hardware components such as camera 110*d*, near infrared or other illuminator 125*b*, and display screen 130. Mobile phone 105*d* may also have other hardware components such as touch screen input devices and other hardware components, shown and not shown in FIG. 1.

In environment 100, each of computing devices 110 may be in wired or wireless communication with a remote database 135 via a local or wide area network 140. Database 140 may contain such information as is shown in FIG. 2.

FIG. 2 shows the contents of database 135 in greater detail. Database 135 may include information regarding what hardware components are present on a particular computing device 105. It may also include identifiers for each computing device 105 and hardware component to facilitate lookup of each. Database 135 may also include characteristic information on particular hardware components, including, merely by way of example, location information on where on computing device 105 the hardware component is located, as well as capability information regarding the hardware component.

Database 135 may also include parameter information for software that may employ the capabilities of a hardware component. For example, parameters may be stored in database 135 for a hardware component so that a computing device 105 may use such parameters in operating a certain hardware component. In some embodiments, parameters may not be stored for one or more hardware components, and instead a computing device 105 may determine such parameters based on the capabilities and/or identifying characteristics of a hardware component.

Figure 3:
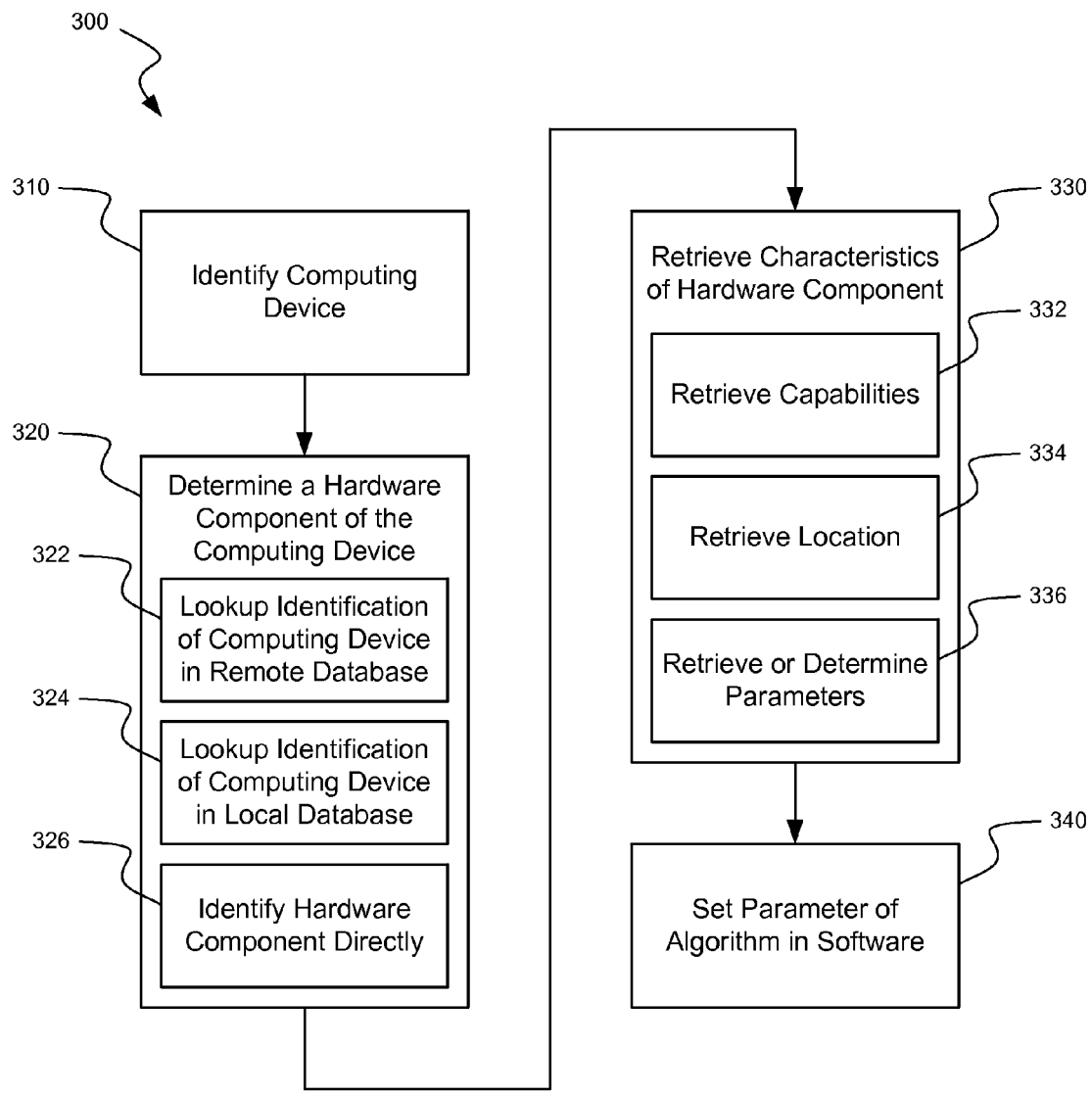
FIG. 3 is a flow diagram of one method of the invention.

FIG. 3 shows a flow diagram of one method 300 of the invention. At block 310, the computing device may be identified. This may be done via determining an identifying string or other data (for example, a vendor ID or product ID) associated with the computing device.

At block 320, the identification of the computing device may be used to determine one or more hardware components present with or installed to the computing device. This may be done either by looking up the identification of the computing device in a local database (block 322) or a remote database (324). In some embodiments, the method, at block 326, may directly determine that a hardware component is present and obtain identifying information (a string or other data (for example, a vendor ID or product ID)) directly from the hardware component or the computing device.

Once one or more hardware components on the computing device have been identified, characteristics of the hardware components may be obtained by reference to the local/remote database at block 330. This may include retrieving capabilities of the hardware component at block 332, and/or location information at block 334.

The capabilities of hardware components may include any operating characteristic of such device. For example, characteristics of a camera may include resolution, exposure, zoom, field of view, color capability, pixel size, shutter types, spectral range, region of interest, read out speed, etc. By further example, characteristics of an eye tracking device may include frequency of readings, resolution, range, etc. In another example, characteristics of illuminators and display screens may be frequency, brightness, type of illumination, beam shaping, coating, etc. Characteristics of touchpads or other tactile input devices may include sensitivity, range, etc. Location information of a hardware component on a computing device may include information which identifies the location of the hardware component relative to other features or hardware components of the computing device.

In some embodiments, at block 336 parameters associated with such characteristics (i.e., capabilities and locations), and usable by a particular software package (for example, eye tracking software, gesture detection software, head movement detection software, image/video capture software, etc.), may either be determined from such characteristic information, or also retrieved from a local or remote database (as shown in FIG. 2). In some embodiments, such particular software package may provide information necessary to determine parameters from the characteristic information. At block 340, the determined/referenced parameters may be used to set parameters of the aforementioned software package. In this manner, devices may be used for functions not originally intended if their capabilities are sufficient for the software package to use as such. For example, a camera and an illumination device on a laptop/notebook computer could be used for eye tracking by an eye tracking software package even though a dedicated eye tracking hardware component is not present.

In some embodiments, the method may determine that a computing device is not present in the database once referenced. In these scenarios, the method may determine what hardware is present on the computing device, the location and/or capabilities of such hardware, and update the database with this information. Identification strings of such computing devices and hardware components may also be determined by the method. In some embodiments, the computing device may be correctly identified, but additional hardware components may be present which are not described by the database. In these situations, the hardware components and their location/capabilities may be added to the database to be associated with the computing device. The method may have algorithms for determining locations/capabilities of hardware components, or may query the user of the computing device to determine such. In some embodiments, separate databases or recent new computing devices and/or hardware components may be referenced to update the primary database.

Figure 4:
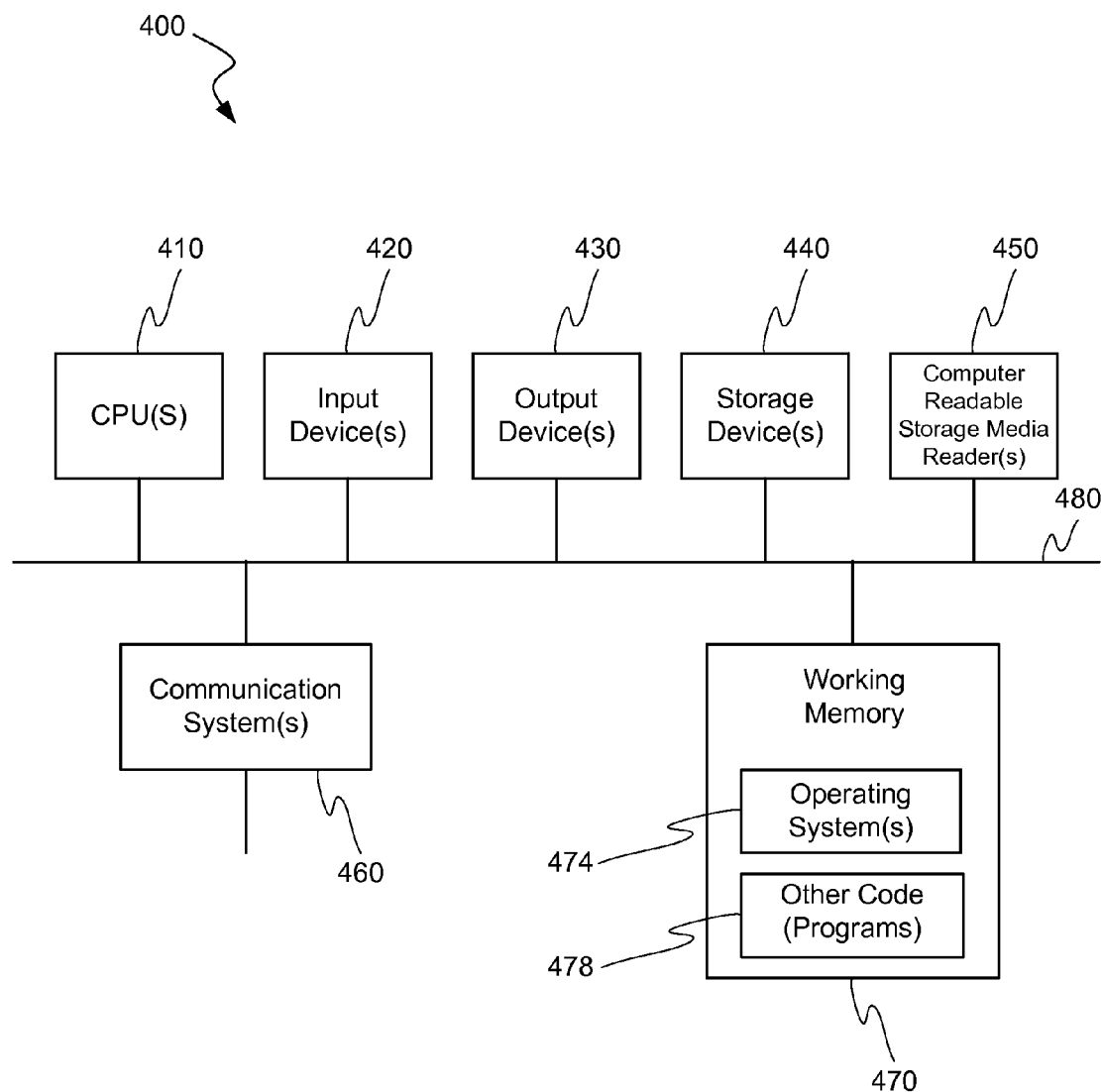
FIG. 4 is a block diagram of an exemplary computer system capable of being used in at least some portion of the apparatuses or systems of the present invention, or implementing at least some portion of the methods of the present invention.

FIG. 4 is a block diagram illustrating an exemplary computer system 400 in which embodiments of the present invention may be implemented. This example illustrates a computer system 400 such as may be used, in whole, in part, or with various modifications, to provide the functions of the software, hardware, methods, and/or other components of the invention such as those discussed above. For example, various functions of software implementing the invention may be controlled by the computer system 400, including, merely by way of example, identifying a computing device, determining hardware components of computing devices, retrieving information about a hardware component, and setting an algorithm of an algorithm of software which may use such devices, etc.

The computer system 400 is shown comprising hardware elements that may be electrically coupled via a bus 490. The hardware elements may include one or more central processing units 410, one or more input devices 420 (e.g., a mouse, a keyboard, etc.), and one or more output devices 430 (e.g., a display device, a printer, etc.). The computer system 400 may also include one or more storage device 440. By way of example, storage device(s) 440 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 450, a communications system 460 (e.g., a modem, a network card (wireless or wired), an infra-red communication device, Bluetooth™ device, cellular communication device, etc.), and working memory 480, which may include RAM and ROM devices as described above. In some embodiments, the computer system 400 may also include a processing acceleration unit 470, which can include a digital signal processor, a special-purpose processor and/or the like.

The computer-readable storage media reader 450 can further be connected to a computer-readable storage medium, together (and, optionally, in combination with storage device(s) 440) comprehensively representing remote, local, fixed, and/or removable storage devices plus storage media for temporarily and/or more permanently containing computer-readable information. The communications system 460 may permit data to be exchanged with a network, system, computer and/or other component described above.

The computer system 400 may also comprise software elements, shown as being currently located within a working memory 480, including an operating system 484 and/or other code 488. It should be appreciated that alternate embodiments of a computer system 400 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 400 may include code 488 for implementing any or all of the function of the various elements of the architecture as described herein. For example, software, stored on and/or executed by a computer system such as system 400, can provide the functions of the software, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for determining what hardware components are installed on a computing device, the method comprising:
   determining an identifier of a computing device, wherein the computing device is configured with an eye tracking software package configured to use a dedicated eye tracking hardware component for eye tracking;
   searching a database, based on the identifier of the computing device, to determine hardware components present in the computing device;
   determining from the database that the dedicated eye tracking hardware component is not present in the computing device but that a camera component is present in the computing device;
   in response to determining that the camera component is present, retrieving from the database information about the camera component, wherein the information comprises operating characteristics of the camera component and a location of the camera component relative to other hardware components of the computing device;
   determining, based on the information about the camera component, whether capabilities of the camera component are sufficient for use by the eye tracking software package for eye tracking; and
   based on a determination that the capabilities of the camera component are sufficient, configuring the eye tracking software package to use the camera component for eye tracking.

2. The method for determining what hardware components are installed on a computing device of claim 1, wherein the computing device is a selection from a group consisting of:
   a personal computer;
   a laptop computer;
   a notebook computer;
   a tablet computer; and
   a mobile phone.

3. The method for determining what hardware components are installed on a computing device of claim 1, wherein the database is a local database of computing devices which identifies hardware components of different computing devices.

4. The method for determining what hardware components are installed on a computing device of claim 1, wherein the database is a remote database of computing devices which identifies hardware components of different computing devices.

5. The method for determining what hardware components are installed on a computing device of claim 1, wherein retrieving information about the camera component comprises:
retrieving at least one parameter corresponding to the at least one camera component; and
wherein configuring the eye tracking software package comprises configuring the eye tracking software package based on the at least one parameter.

6. A non-transitory machine readable medium having instructions thereon for determining what hardware components are installed on a computing device, the instructions executable by one or more processors for at least:
determining an identifier of a computing device, wherein the computing device is configured with an eye tracking software package configured to use a dedicated eye tracking hardware component for eye tracking;
searching a database, based on the identifier of the computing device, to determine hardware components present in the computing device;
determining from the database that the dedicated eye tracking hardware component is not present in the computing device but that a camera component is present in the computing device;
in response to determining that the camera component is present, retrieving from the database information about the camera component, wherein the information comprises operating characteristics of the camera component and a location of the camera component relative to other hardware components of the computing device;
determining, based on the information about the camera component, whether capabilities of the camera component are sufficient for eye tracking with an eye tracking software package; and
based on a determination that the capabilities of the camera component are sufficient for use by the eye tracking software package for eye tracking, configuring the eye tracking software package to use the camera component for eye tracking.

7. The non-transitory machine readable medium of claim 6, wherein the database is a local database of computing devices which identifies hardware components of different computing devices.

8. The non-transitory machine readable medium of claim 6, wherein retrieving information about the camera component comprises:
retrieving at least one parameter corresponding to the at least one camera component; and
wherein configuring the eye tracking software package comprises configuring the eye tracking software package based on the at least one parameter.

9. The non-transitory machine readable medium of claim 6, wherein the database is a local database or a remote database of computing devices which identifies hardware components of different computing devices.

10. A system for determining what hardware components are installed on a computing device, wherein the system comprises:
one or more storage devices with executable instructions stored thereon;
one or more processors executing the instructions for performing steps comprising:
determining an identifier of a computing device, wherein the computing device is configured with an eye tracking software package configured to use a dedicated eye tracking hardware component for eye tracking;
searching a database, based on the identifier of the computing device, to determine hardware components present in the computing device;
determining from the database that the dedicated eye tracking hardware component is not present in the computing device but that a camera component is present in the computing device;
in response to determining that the camera component is present, retrieving from the database information about the camera component, wherein the information comprises operating characteristics of the camera component and a location of the camera component relative to other hardware components of the computing device;
determining, based on the information about the camera component, whether capabilities of the camera component are sufficient for use by the eye tracking software package; and
based on a determination that the capabilities of the camera component are sufficient, configuring the eye tracking software package to use the camera component for eye tracking.

11. The system for determining what hardware components are installed on a computing device of claim 10, wherein the database is a local database of computing devices which identifies hardware components of different computing devices.

12. The system for determining what hardware components are installed on a computing device of claim 10, wherein retrieving information about the camera component comprises:
retrieving at least one parameter corresponding to the at least one camera component; and
wherein configuring the eye tracking software package comprises configuring the eye tracking software package based on the at least one parameter.

13. The system for determining what hardware components are installed on a computing device of claim 10, wherein the database is a remote database of computing devices which identifies hardware components of different computing devices.

* * * * *